April 17, 1945.  T. A. HICKS, SR  2,373,829
ANGLE EDGING DEVICE
Filed Aug. 26, 1943

INVENTOR.
TIP A. HICKS SR.
BY
George Douglas Jones
ATTORNEY

Patented Apr. 17, 1945

2,373,829

UNITED STATES PATENT OFFICE 2,373,829

ANGLE EDGING DEVICE

Tip A. Hicks, Sr., Catonsville, Md., assignor to The Glenn L. Martin Company, Middle River, Md., a corporation of Maryland Application August 26, 1943, Serial No. 500,154

4 Claims. (Cl. 29—76)

This invention relates generally to edging devices, and more particularly to a new and improved device for shaping one surface of an object at any desired angle to an adjacent surface of the object.

I am aware that heretofore various mitering devices have been proposed, that is, devices which can be used to hold an article while an edge of the article is being bevelled. However, those devices are not suitable for bevelling or otherwise shaping a surface of an object accurately with respect to another adjacent surface of the object.

The present invention provides an edging device which carries an edging tool and which may be used to shape one surface of an object at a predetermined angle to another and adjacent surface of the article and which may be employed on objects of a wide variety of sizes, shapes and compositions.

In the drawing accompanying and forming a part of this specification,

Figure 1:
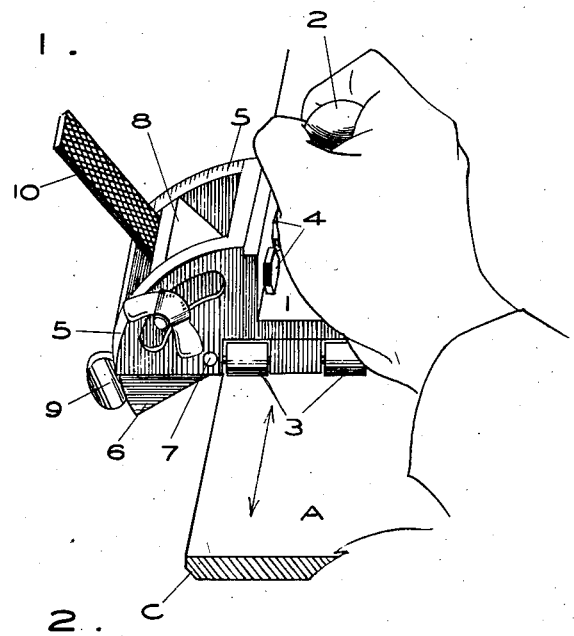
Figure 1 is a perspective view of one embodiment of the present invention applied to the side surface of an object whose edge surface is to be shaped at an angle to said side surface.
Figure 2:
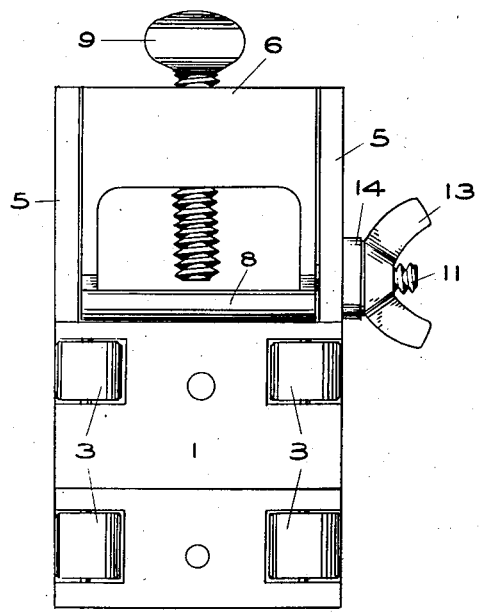
Figure 2 is a bottom plan view of the device of Fig. 1.
Figure 3:
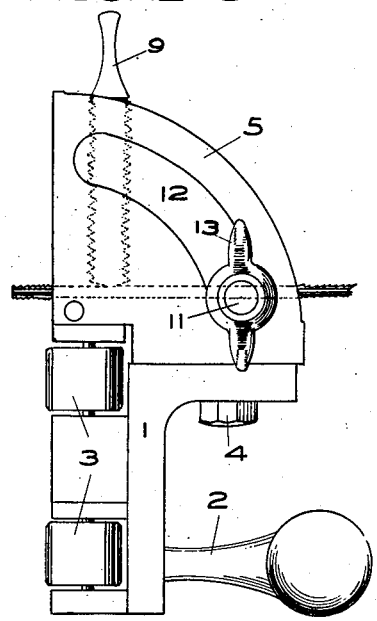
Figure 3 is a side elevational view of the device of Fig. 2 with an edging tool in place therein.

The embodiment of the present invention illustrated in the accompanying drawing comprises a body I provided with a handle 2 and a plurality of parallel axis rollers 3 projecting slightly from the surface on the side opposite handle 2. The body I has affixed thereto, as by cap screws 4, a member including parallel, spaced side walls 5 which project from the body parallel to the axes of rollers 3. Between side walls 5 the tool-carrying member 6 is movably mounted on pivots 7 disposed in side walls 5. This tool-carrying member includes a tool-backing plate 8 and a thumb screw 9. When an edging tool 10 or file is placed in the tool-carrying member 6 and is locked against plate 8 by screw 9, the tool and the tool-carrying member may pivot as a unit about pivots 7 thru an angle of approximately 90°. Since the face of the thus mounted tool 10 is in a plane transverse to the axes of rollers 3, it is in position to operate on the surface of an object which is adjacent to and disposed at an angle to the surface of the object which supports rollers 3 and on which the edging device may move.

The tool-carrying member 6 is provided with a threaded projection 11 which extends thru an arc-shaped opening 12 in one side wall 5 of the body I and carries a thumb nut 13 and washer 14. When the tool-carrying member has been adjusted so that the tool 10 is at a predetermined angle to the plane of rollers 3, which is suitable for shaping a surface of an object at the desired angularity to the surface over which the rollers 3 and body I are to move, the tool-carrying member may be secured in such adjusted position with non-slipping contact by turning the thumb screw 13 on projection 11 and thereby pressing washer 7 against side wall 5.

The manner of using the above described embodiment of this invention will be understood by reference to Fig. 1. With the tool 10 mounted and secured at the proper angle, the device is placed on one surface of object A, which in this instance is the side surface, so that the rollers rest on that surface and the tool 10 engages the edge to be shaped. By gripping the handle 2, as shown in Fig. 1, an operator may move the device over the side surface of the object with the tool 10 pressing against the adjacent edge surface and cutting it away, as is indicated at C in Fig. 1.

It will be understood that the devices of this invention may be employed with objects composed of various materials. For example, it has been found to be quite satisfactory in shaping the edges of metal parts used in airplane construction, but it obviously may be used with a wide variety of objects and with objects composed of any one of a wide range of materials.

Having thus described the invention so that others skilled in the art may be able to understand and practice the same, I state that what I desire to secure by Letters Patent is defined in what is claimed.

What is claimed is:

1. An edging tool comprising a carriage adapted to be moved along the edge of a sheet of material, a bracket extension on said carriage projecting beyond the edge of the sheet, a clamping member pivotally mounted in said bracket adapted to hold a file, the axis of said pivot extending parallel with the direction of motion of said carriage, clamping means by which the angle of the file can be adjusted with respect to said carriage and the edge of the sheet.

2. An edging tool comprising a carriage adapted to be moved along the edge of a sheet of material, a bracket extension on said carriage projecting beyond the edge of the sheet, a clamping member mounted on said bracket adapted to hold a file, means to pivot said clamping member about an axis parallel with the direction of motion of said carriage, and means to adjustably secure said clamping member to said bracket extension.

3. An edging tool comprising a carriage adapted to be moved along the edge of a sheet of material, a bracket extension on said carriage projecting beyond the edge of the sheet, rollers mounted on that portion of said carriage adapted to move over the sheet along the edge thereof, a clamping member mounted on said bracket adapted to hold a file, means to pivot said clamping member about an axis parallel with the direction of motion of said carriage, and means to adjustably secure said clamping member to said bracket extension.

4. An edging tool comprising a carriage adapted to be moved along the edge of a sheet of material, a bracket extension on said carriage projecting beyond the edge of the sheet, a clamping member pivotally mounted in said bracket adapted to hold a file, the axis of said pivot extending parallel with the direction of motion of said carriage, clamping means by which the angle of the file can be adjusted with respect to said carriage and the edge of the sheet, and roller means mounted on said carriage at one side of the pivot on that portion of the carriage adapted to move over the sheet.

TIP A. HICKS, Sr.